(12) United States Patent
Miller (10) Patent No.: US 11,964,760 B2
(45) Date of Patent: *Apr. 23, 2024

(54) DRONE AIRSTATION METHOD AND SYSTEM

(71) Applicant: George Miller, Dallas, TX (US)

(72) Inventor: George Miller, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,774

(22) Filed: Jan. 20, 2023

(65) Prior Publication Data

US 2023/0227156 A1 Jul. 20, 2023

Related U.S. Application Data

(63) Continuation of application No. 16/868,713, filed on May 7, 2020, now Pat. No. 11,560,226.

(60) Provisional application No. 62/844,467, filed on May 7, 2019.

(51) Int. Cl.
| | |
|---|---|
| *B64C 39/02* | (2023.01) |
| *B60L 8/00* | (2006.01) |
| *B64C 1/00* | (2006.01) |
| *B64C 1/16* | (2006.01) |
| *B64D 27/24* | (2006.01) |
| *B64U 30/20* | (2023.01) |
| *B64U 50/19* | (2023.01) |
| *G05D 1/00* | (2006.01) |

(52) U.S. Cl.
CPC ............ *B64C 39/022* (2013.01); *B60L 8/003* (2013.01); *B64C 1/0009* (2013.01); *B64C 1/16* (2013.01); *B64C 39/024* (2013.01); *B64D 27/24* (2013.01); *G05D 1/0061* (2013.01); *B64C 2001/0045* (2013.01); *B64U 30/20* (2023.01); *B64U 50/19* (2023.01); *B64U 2201/202* (2023.01)

(58) Field of Classification Search
CPC . B64C 39/022; B64C 27/20; B64U 2201/202; B64U 2201/0045; B64U 10/13; B64U 10/14; B64U 10/16; B64U 10/30; B64U 10/60
USPC ........................................................ 244/30
See application file for complete search history.

(56) References Cited

U.S. PATENT DOCUMENTS

| | | | |
|---|---|---|---|
| 9,738,381 B1* | 8/2017 | Loud | B64B 1/02 |
| 10,926,890 B2* | 2/2021 | Ghosh | B64D 27/24 |
| 2018/0022461 A1* | 1/2018 | Nunes | B64C 39/024 |
| | | | 244/26 |
| 2018/0237141 A1* | 8/2018 | Heppe | B64B 1/52 |

(Continued)

FOREIGN PATENT DOCUMENTS

| | | | |
|---|---|---|---|
| DE | 102020114605 A1 | * | 12/2021 |
| GB | 2560486 A | * | 9/2018 |

(Continued)

*Primary Examiner* — Christopher P Ellis
(74) *Attorney, Agent, or Firm* — Patti Pershem, PLLC; John J. Patti (57) ABSTRACT

A method is provided. An airship is maneuvered to a desired location and oriented with the thruster such that ambient wind is traveling in a direction that is substantially parallel to the longitudinal axis of the fuselage. The airflow from the ambient wind is straightened with the flow straightener to generate a substantially laminar flow. The turbine is engaged with the airflow generated by the ambient wind to generate electricity, and the electricity generated by the turbine is rectified with the rectifier and stored in the storage array.

9 Claims, 8 Drawing Sheets

(56) References Cited

U.S. PATENT DOCUMENTS

| | | | |
|---|---|---|---|
| 2019/0030447 A1* | 1/2019 | Zima | A63H 27/10 |
| 2019/0077510 A1* | 3/2019 | Panas | B64B 1/62 |
| 2020/0354055 A1* | 11/2020 | Miller | G05D 1/0061 |
| 2020/0361631 A1* | 11/2020 | Leone | B64D 3/00 |
| 2020/0369375 A1* | 11/2020 | Leone | B64B 1/50 |
| 2020/0385145 A1* | 12/2020 | Mackin | B64C 39/024 |

FOREIGN PATENT DOCUMENTS

| | | | |
|---|---|---|---|
| KR | 101678164 B1 * | 1/2019 | |
| WO | WO-2016195532 A1 * | 12/2016 | B25J 13/08 |
| WO | WO-2018122830 A1 * | 7/2018 | B64B 1/44 |
| WO | WO-2019089997 A1 * | 5/2019 | |
| WO | WO-2020125839 A1 * | 6/2020 | |
| WO | WO-2020249447 A1 * | 12/2020 | |
| WO | WO-2021011097 A1 * | 1/2021 | B64B 1/30 |
| WO | WO-2021176248 A1 * | 9/2021 | |
| WO | WO-2022129811 A1 * | 6/2022 | |

* cited by examiner

DRONE AIRSTATION METHOD AND SYSTEM

CROSS-REFERENCE

This application is a continuation of U.S. patent application Ser. No. 16/868,713 (now U.S. Pat. No. 11,560,226), which is entitled "DRONE AIRSTATION METHOD AND SYSTEM," and which was filed on May 7, 2020, and which claims priority to U.S. Provisional Patent Application Ser. No. 62/844,467, which is entitled "DRONE AIRSTATION METHOD AND SYSTEM," and which was filed on May 7, 2019. Each application is incorporated by reference for all purposes.

TECHNICAL FIELD

The invention relates generally to an airstation and, more particularly, to an airstation or airship for maintaining a fleet of delivery drones.

BACKGROUND

Over the past few years, unmanned aerial vehicles (UAVs) or drones have become increasingly used in commercial applications. Once of the many applications pioneered with drones is delivery of material, and airships have even been used for operating as an airborne warehouse for delivery of goods (see, e.g., U.S. Pat. No. 10,321,125). However, there are some significant drawbacks to existing systems—namely, most airships require frequent returns to a base of operation for refueling or recharging. The inability to have a largely self-sustaining airship limits its applicability and duration of operation in potential autonomous or remote controlled systems in urban, geographic difficult, or harsh environments. Therefore, there is a need for an improved airship. Some examples of conventional systems are: U.S. Pat. Nos. 9,849,981; 9,536,216; 9,852,644; 10,035,623; and 9,836,049.

SUMMARY

An embodiment of the present disclosure, accordingly, provides an apparatus. The apparatus comprises: a fuselage with a longitudinal axis and a transverse axis having: a controller having a storage array, a rectifier, and power distributor, wherein the rectifier is coupled to the storage array, and wherein the power distributor is coupled to the storage array; and a hanger that is secured to the controller; a thruster secured to the fuselage; a wind generator having: a housing that is secured to the fuselage substantially parallel to the longitudinal axis, wherein the housing has an interior that is hollow between first and second openings; a flow straightener secured within the interior of the housing proximate to the first opening; and a turbine secured within the interior of the housing between the flow straightener and the second opening, wherein the turbine is electrically coupled to the rectifier; and a lift cell that is secured to the wind generator.

In accordance with an embodiment of the present disclosure, the lift cell is substantially filled with helium gas.

In accordance with an embodiment of the present disclosure, the turbine further comprises: a bearing assembly that is secured to the housing of the wind generator; a torque converter that is secured to the housing of the wind generator; a turbine shaft that extends between the bearing assembly and the torque converter; a plurality of blades, wherein each blade extends between the bearing assembly and the torque converter, wherein the shaft and the plurality of blades are collectively adapted to freely rotate; a generator shaft that extends from the torque converter, wherein rotation of the turbine shaft and plurality of blades causes rotation of the generator shaft; and an electric generator that is coupled to the generator shaft and that is coupled to the rectifier, wherein the electric generator is adapted to produce electricity.

In accordance with an embodiment of the present disclosure, the turbine further comprises a plurality of turbines.

In accordance with an embodiment of the present disclosure, the controller further comprises a tether, wherein the tether further comprises: a power controller; a guide coil assembly that is coupled to the power controller, wherein the guide coil assembly includes a guide wire; a guide wire coupler that is secured to an end of the guide wire, wherein the guide wire coupler is configured to be secured to and inductively coupled to a power control receptacle so as to transmit and receive power control packets over the guide wire to the power controller, and wherein the guide wire coupler is dimensioned to be carried by a battery-powered drone; a power coil assembly that is coupled to the power controller and the rectifier, wherein the power coil assembly further comprises a power cable; and a power cable coupler having: a guide loop that is configured to guide the power cable coupler along the guide wire; and an insert that is coupled to an end of the power cable and that is configured to be secured to and inductively coupled to a power transmission receptacle so as to deliver power to the receptacle over the power cable.

In accordance with an embodiment of the present disclosure, the apparatus further comprises a photovoltaic cell that is secured to the lift cell and that is coupled to the rectifier.

In accordance with an embodiment of the present disclosure, lift cell further comprises a plurality of lift cells.

In accordance with an embodiment of the present disclosure, a method is provided. The method comprises: maneuvering an airship to a desired location, wherein the airship includes: a fuselage with a longitudinal axis and a transverse axis having: a controller having a storage array, a rectifier, and power distributor, wherein the rectifier is coupled to the storage array, and wherein the power distributor is coupled to the storage array; and a hanger that is secured to the controller; a thruster secured to the fuselage; a wind generator having: a housing that is secured to the fuselage substantially parallel to the longitudinal axis, wherein the housing has an interior that is hollow between first and second openings; a flow straightener secured within the interior of the housing proximate to the first opening; and a turbine secured within the interior of the housing between the flow straightener and the second opening, wherein the turbine is electrically coupled to the rectifier; and a lift cell that is secured to the wind generator; orienting the airship with the thruster such that ambient wind is traveling in a direction that is substantially parallel to the longitudinal axis of the fuselage; straightening airflow generated by the ambient wind with the flow straightener to generate a substantially laminar flow; engaging the turbine with the airflow generated by the ambient wind to generate electricity; rectifying the electricity generated by the turbine with the rectifier; and storing the storage array.

In accordance with an embodiment of the present disclosure, the controller further comprises a tether, wherein the tether further comprises: a power controller; a guide coil assembly that is coupled to the power controller, wherein the guide coil assembly includes a guide wire; a guide wire coupler that is secured to an end of the guide wire, wherein the guide wire coupler is configured to be secured to and inductively coupled to a power control receptacle so as to transmit and receive power control packets over the guide wire to the power controller, and wherein the guide wire coupler is dimensioned to be carried by a battery-powered drone; a power coil assembly that is coupled to the power controller and the rectifier, wherein the power coil assembly further comprises a power cable; and a power cable coupler having: a guide loop that is configured to guide the power cable coupler along the guide wire; and an insert that is coupled to an end of the power cable and that is configured to be secured to and inductively coupled to a power transmission receptacle so as to deliver power to the receptacle over the power cable, and wherein the method further comprises: lifting the guide wire coupler with the battery-power drone; carrying the guide wire coupler to the power control receptacle; inserting the guide wire coupler into the power control receptacle; securing the guide wire coupler with a grappler on the power control receptacle; uncoiling the power cable so that the power cable coupler is guided by the guide loop and moving under the force of gravity; and securing the insert into the power transmission receptacle.

In accordance with an embodiment of the present disclosure, the method further comprises: receiving first and second connection signals over the over the guide wire and power cable, respectively, by the power controller; receiving a fill level signal from the storage array by the power controller; transmitting a power delivery packet to the power control receptacle; receiving power by the rectifier from the power cable in response to the power delivery packet.

In accordance with an embodiment of the present disclosure, an apparatus is provided. The apparatus comprises: a fuselage with a longitudinal axis and a transverse axis having: a controller having a storage array having a plurality of batteries, a rectifier, and power distributor, wherein the rectifier is electrically coupled to the storage array, and wherein the power distributor is electrically coupled to the storage array; and a hanger that is secured to the controller, wherein the hanger includes a plurality of recharge bays that are each coupled to the power distributor, wherein each recharge bay is configured to receive a battery-powered drone; first and second thrusters, wherein each thruster is secured to the fuselage; a wind generator having: a substantially cylindrical housing that is secured to the fuselage substantially parallel to the longitudinal axis, wherein the housing includes: a first opening at a first end of the housing; a second opening at a second end of the housing; and an interior space between the first and second ends; a flow straightener secured within the interior space of the housing proximate to the first opening of the housing; and a turbine secured within the interior of the housing between the flow straightener and the second opening, wherein the turbine is electrically coupled to the rectifier; and a lift cell that is secured to the wind generator, wherein the lift cell is substantially filled with helium gas.

In accordance with an embodiment of the present disclosure, the housing further comprises: a nozzle that extends from the first opening and forms a first portion of the interior space, wherein the flow straightener is positioned within the nozzle; a tunnel that extends from the nozzle and forms a second portion of the interior space, wherein the blades of each of the plurality of turbines are positioned within the tunnel; and a diffuser that extends from the tunnel to the second opening to the second opening and forms a third portion of the interior space.

In accordance with an embodiment of the present disclosure, the controller includes a plurality of sensors.

In accordance with an embodiment of the present disclosure, the plurality of sensors includes radar and forward-looking infrared sensors.

In accordance with an embodiment of the present disclosure, the apparatus has an autonomous mode and a manual mode.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION

Refer now to the drawings wherein depicted elements are, for the sake of clarity, not necessarily shown to scale and wherein like or similar elements are designated by the same reference numeral through the several views.

Figure 1:
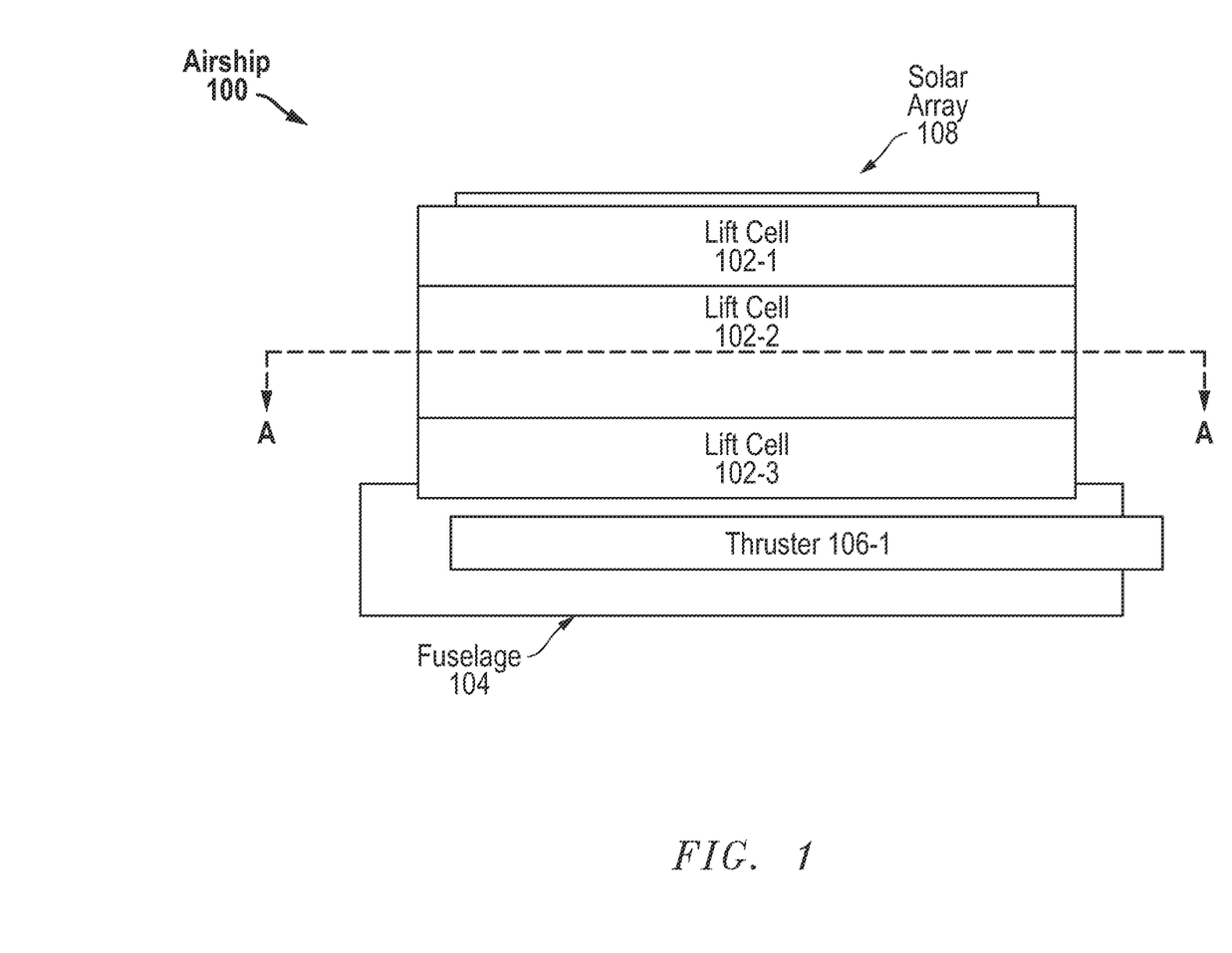
FIG. 1 is a side view of an airship in accordance with a preferred embodiment of the present disclosure.
Figure 2:
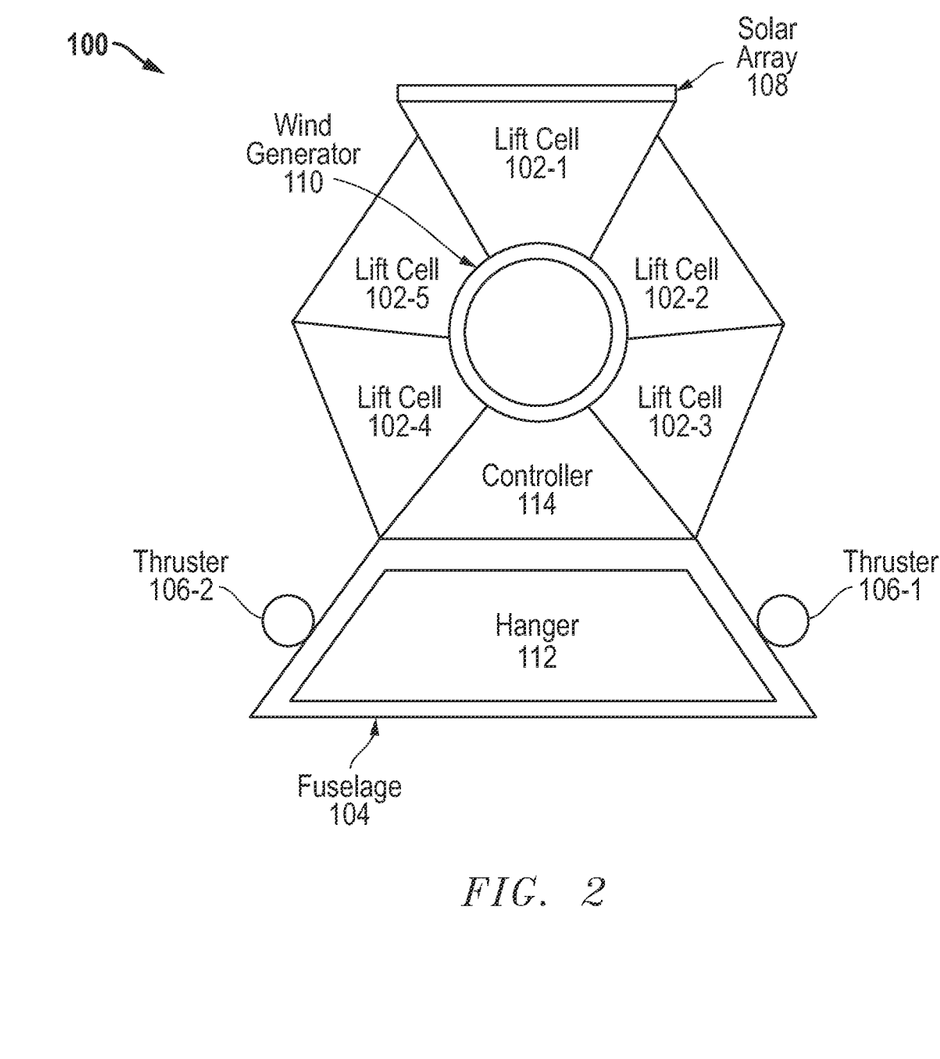
FIG. 2 is a front view of the airship of FIG. 1.
Figure 3:
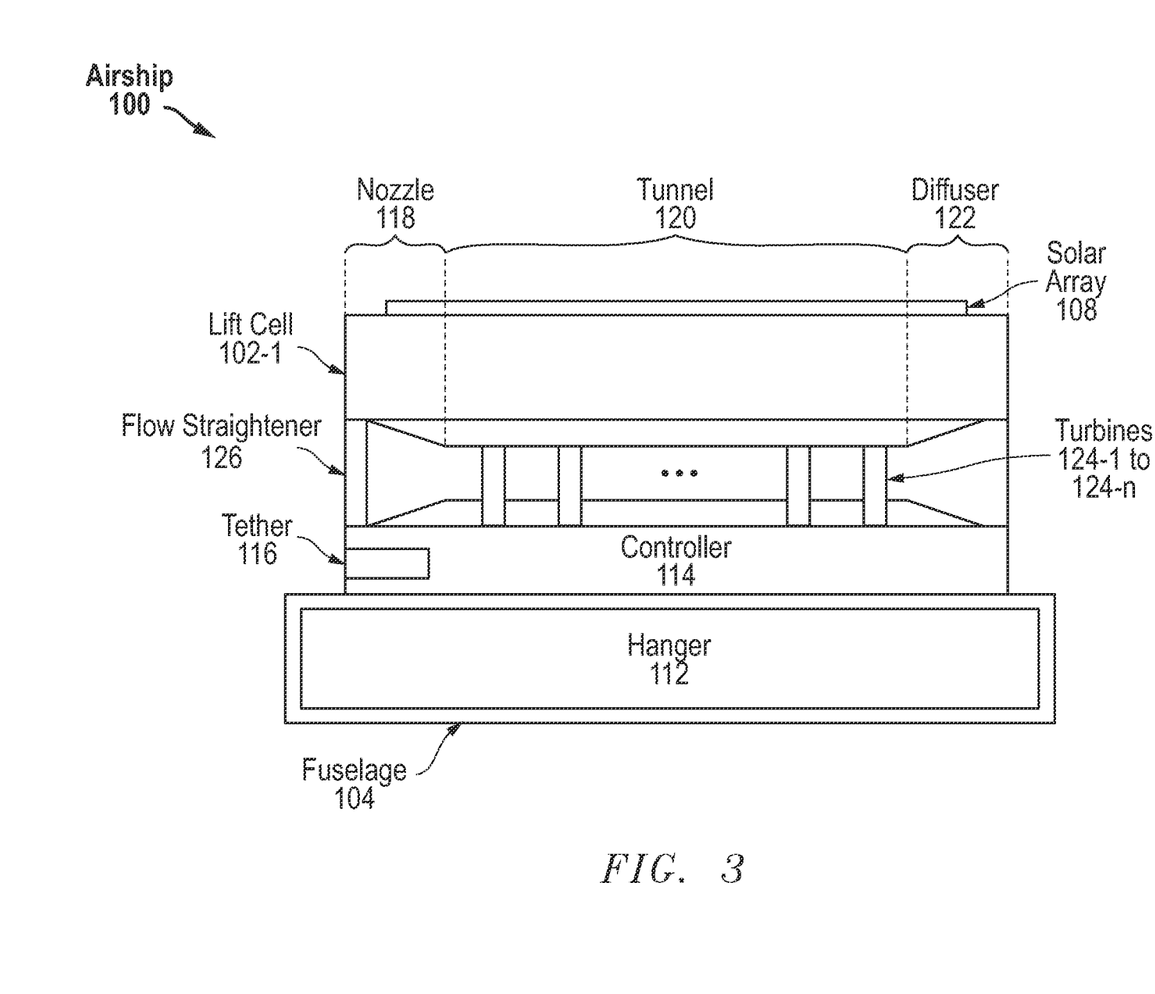
FIG. 3 is a cross-section view of the airship of FIG. 1 along section line A-A.

Referring to FIGS. 1-3 of the drawings, reference numeral 100 corresponds to an example airship in accordance with a preferred embodiment of the present disclosure. The airship 100 generally comprises lift cells 102-1 to 102-5 (of which there may be a single lift cell or more lift cells), a wind generator 110, a fuselage 104, and thrusters 106-1 to 106-2. In a typical configuration, the wind generator 110 can be a generally cylindrical, hollow body (e.g. having an interior space) that is surrounded by the fuselage 104 and lift cells 102-1 to 102-5 (e.g., each being secured to the wind generator 110). The lift bodies 102-1 to 102-5 can generally provide lift for the airship 100 as they can be filled with helium gas or other light gasses (e.g., hot air, neon, or other lighter than air gasses or gas mixtures). The fuselage 104 can generally include the controller 114 and a hanger bay 112. Typically, the controller 114 can operate in a manual mode or autonomous mode and includes the avionics, sensors (such as radar and forward-looking infrared or FLIR), guidance systems, power storage arrays (e.g., battery banks), rectifiers, and power distributions systems, while the hanger 112 can includes storage for to-be-delivered goods, recharge pads for drones, and storage bays for drones. Additionally, as shown in the example of FIGS. 1-3, thrusters 106-1 to 106-2 are included to drive and orient the airship 100. There may be fewer or more thrusters 106, and the thrusters 106 may also be secured to lift cells (e.g., 102-1 to 102-5). Also, as shown in FIGS. 1-3, the airship 100 can have many in-flight power recharge systems. One example of a recharge is the solar array 108 (which may be one or more solar cells) that are secured to the exterior of the airship 100 and that can deliver power to the controller 114. On other example is the wind generator 110, and another example is the tether 116.

Turning to the wind generator 110 (an example of which can be seen in FIGS. 2-4), it is able to generate power from ambient airstreams or wind while the airship 100 is anchored or stationary. As stated above, the wind generator 110 can typically include a generally cylindrical housing with an interior space. The housing itself is show in the example of FIG. 3 as having a nozzle 118, tunnel 120, and diffuser 122—with the nozzle 118 and diffuser 122 each being proximate to openings in the housing. Typically, once the airship 100 is stationary or anchored, the airship 100 can be oriented (e.g., by thrusters 106-1 to 106-2) to be generally parallel to the ambient airflow or wind; thus, the wind would be naturally directed into an entrance or opening in the housing proximate to the nozzle 118. The air entering the housing would encounter the flow straightener 126 (which is optional) that would help ensure that the flow within the interior of the housing is largely laminar. The nozzle 118 can be used to increase the velocity of the airflow. Increasing the velocity of the airflow at the entrance would help to improve the operation of the turbines 124-1 to 124-n (discussed below) in tunnel 120. Once past the tunnel 120, the diffuser 122 would decrease the velocity of the airflow on exit to help prevent the exit airflow from changing the orientation of the airship 100.

Figure 4:
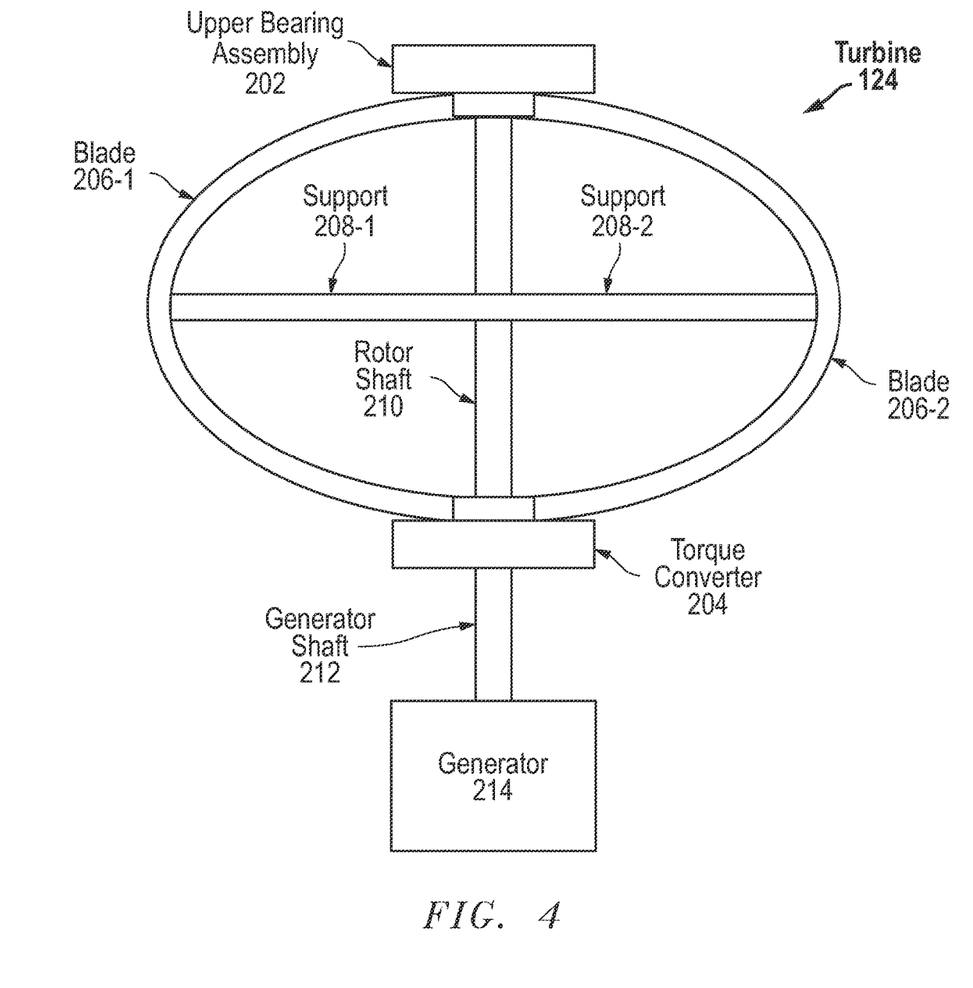
FIG. 4 depicts an example turbine of FIG. 3.

To help harvest as much energy as possible, the turbines 124-1 to 124-n within the tunnel 122 would be typically vertically oriented—although horizontally oriented turbines are possible. Typically, vertically oriented turbines do not require a perpendicular airflow to achieve maximum efficiency—like horizontally oriented turbines. Moreover, vertically oriented turbines would need fewer attachment points (which affect the characteristics of the airflow) and would be simpler to service. Usually and as shown in the example of FIG. 4, the turbine 124 would be coupled or secured to the tunnel 120 with upper bearing assembly 202 and torque converter 204. Typically, the roller bearing assembly 202 would include tapered roller bearing and race or a combination roller bearing/needling bearing as known in the art, and the torque converter 204 can a fluid driven coupling known in the art and may include a transmission. Extending between the bearing assembly 202 and torque converter, as shown in this example, is a rotor shaft 210 that is adapted to freely rotate. Blades 206-1 and 206-2 are secured to the shaft 210 and can be shaped to generate lift when an airflow is provided so as to rotate the shaft 210. Also, as shown, there be supports 208-1 and 208-2 that provide mechanical stability to the blades 206-1 and 206-2. There may be fewer or more supports 208, and there may be fewer or more blades 206. Once under rotation, the torque converter 204 can convert the rotation of the shaft 210 into rotation of generator shaft 212. Rotation of shaft 212 can then cause generator 214 to generate alternating current (AC) electricity. This AC electricity can be provided to a rectifier within the controller 114 so as to be placed in a storage array (e.g. batteries) and/or provided to other systems via a power distributor within controller 114.

Figure 5:
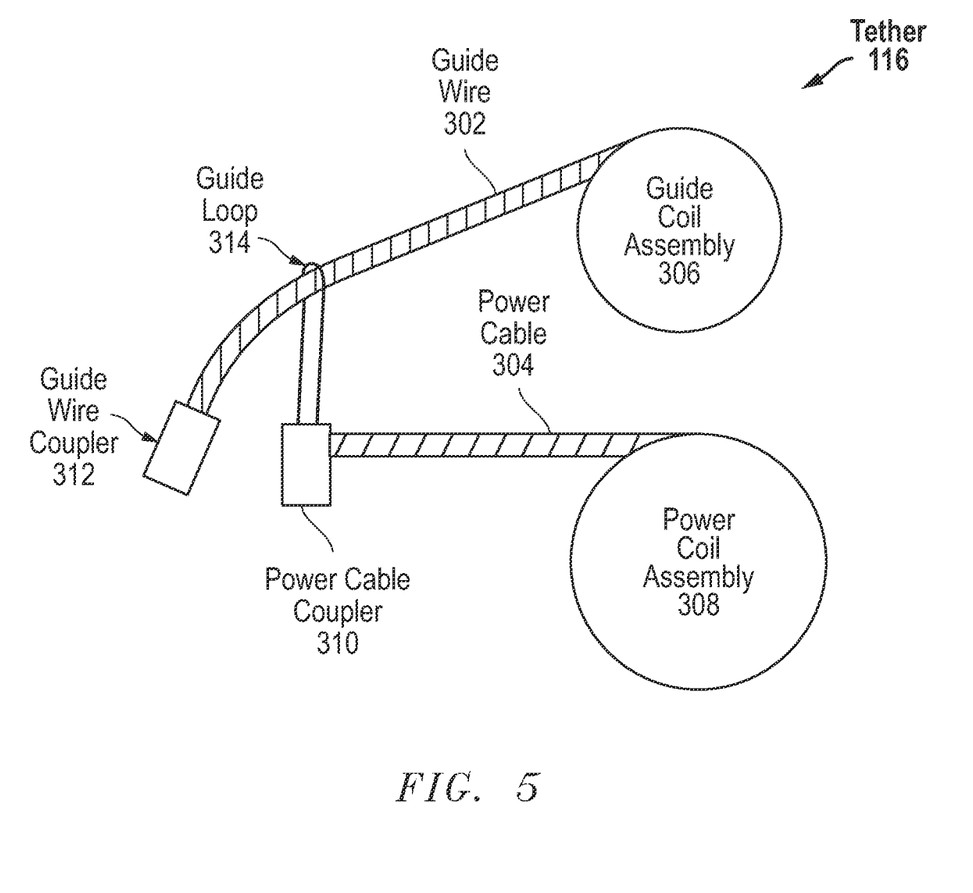
FIG. 5 depicts an example of the tether of FIG. 3.
Figure 6:
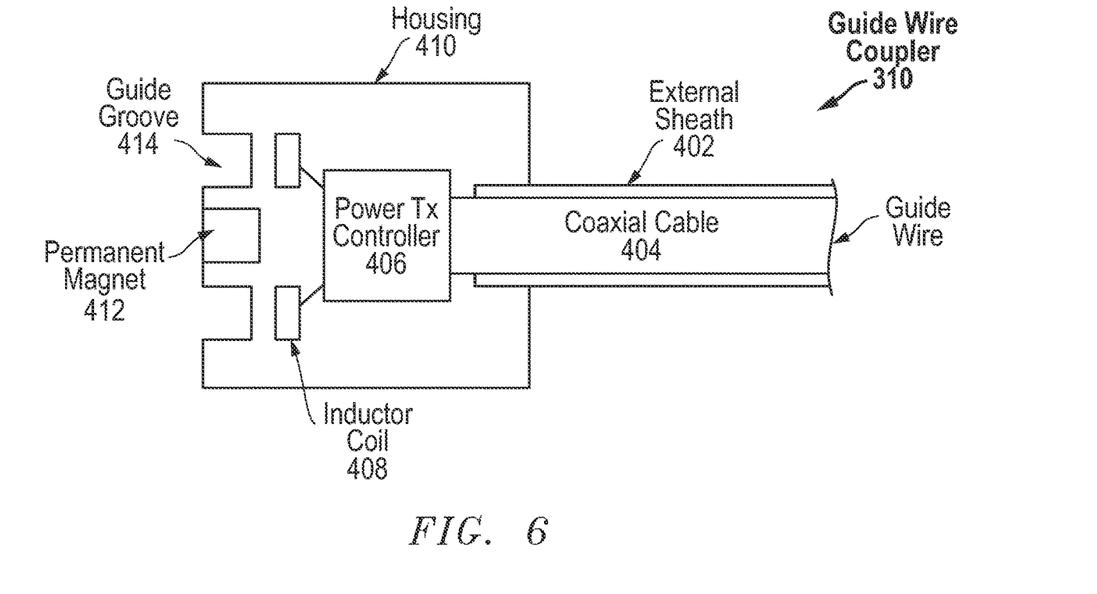
FIG. 6 depicts an example section view of the guide wire coupler of FIG. 5.
Figure 7:
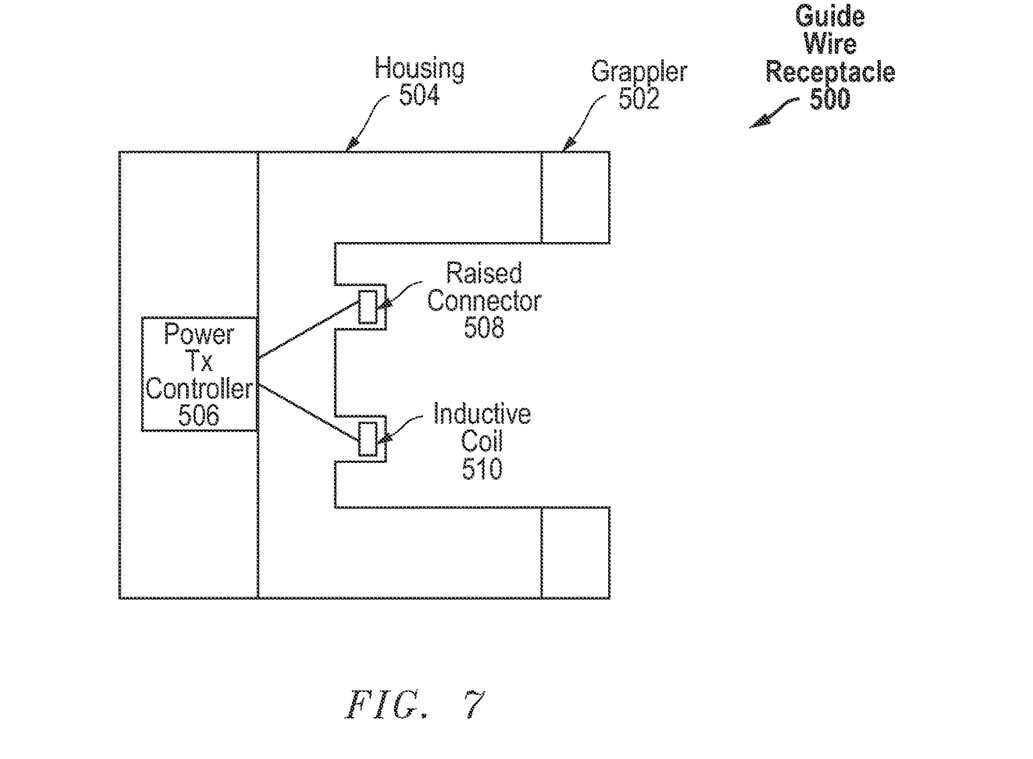
FIG. 7 depicts an example section view of a guide wire receptacle.

Turning now to the tether 116 (an example of which is shown in FIGS. 5-7), the tether 116 can serve two purposes: an anchor and power receiver. Airship 100 would likely be used in highly urban settings, and it would be desirable to anchor the airship 100 to the roof of a building so that it is largely stationary. As a side benefit, the building can deliver power to airship over the tether 114. Typically, the tether 114 can be comprised of a two-cable system. There can be a guide wire 302 that can be adapted to act as an anchoring tether, and there can be a power cable 304 that would be suited to deliver AC electricity to the rectifier within controller 114.

Typically, the guide wire 302 would be part of a coil guide assembly 306 that would include a mechanical system known in the art to coil the wire 302 and would include communications circuitry that can interface with the controller 114 to allow power needs to be metered. The wire 302, itself, can be comprise of one or more coaxial cables 404 surrounded by a heavy cable sheath 402 (which may, for example, be many smaller steel cables braded around the coaxial cable 404), with the coaxial cable 404 providing communications and the sheath 402 providing the mechanical support. Both the sheath 402 and coaxial cable 404 are secured to coupler 312, which is dimensioned to be guided by a drone under the force gravity. The coupler 312 is generally comprised of a housing 410 with guide groove 414 on its face. Also, there can be a permanent magnet (e.g., neodymium) to magnetically couple the coupler 312 to a receptacle 500. The coaxial cable 404 would be coupled to a power receiver controller 406, and the controller 406 would be coupled to one or more inductor coils 408 that are located proximate to the guide groove 414. The coaxial cable 404 may also include in-line repeaters known in the art that can boost communications signals over long distances.

The receptacle 500 can similarly have a housing 504 that is dimensioned to receive the housing 410. When the coupler 310 is guided to the receptacle 500 under the force of gravity, the permanent magnet 412 would be attracted to center of the receptacle 500, and the geometry of the housing 504 of the receptacle 500 would guide the housing 410 such that the raised connector 508 would engage the guide groove 414. When the coupler 312 is engaged with the receptacle 500 the one or more inductive coils 510 would be inductively coupled to the inductive coils 408 such that the power transmit controller 406 would be able to communicate with one another. Additionally, the receptacle 500 can also include a grappler 502 that would mechanically engage the housing 410 so as to anchor the airship 100.

The power cable 304, like that of the guide wire 302, can be stored and extended through a power coil assembly 308. The power coil assembly 308 can be coupled to a rectifier in the controller 114. Typically, the power cable coupler 310 (which can have a similar geometry to the that of the coupler 312) can be guided using a guide loop 314 that slides over guide wire to its receptacle (not shown). Some benefits in addition to being able to use the grid would be ability to sell power back to the grid when self-generated power. For example, when the power generated is greater than recharge needs or when internal storage (e.g., batteries) are full, the airship 100 can function as an energy generator for the grid.

Typically, in operation, the airship 100 positions itself in proximity to an anchor location. Once in place, a guide drone is dispatched from hanger 112 and the guide wire 314 is unwound. The coupler 312 moves under the force of gravity to the anchor location, while the guide drone can guide the coupler 314 to the receptacle. Once the coupler 312 is proximate to the receptacle 500, the permanent magnet 412 and geometry of housing 504 can guide the coupler 312 into a final position where the grappler 502 can be engaged. The controllers 406 and 506 can then negotiate, and, once negotiated, the power cable 310 can be lowered. The power cable 310 can then be largely guided by the loop 314 under the force of gravity to its receptacle. The guide drone can also provide some additional guidance to coupler 310. Once engaged, packets for transmission, termination, and supply currents can be communicated over the coaxial cable.

Figure 8:
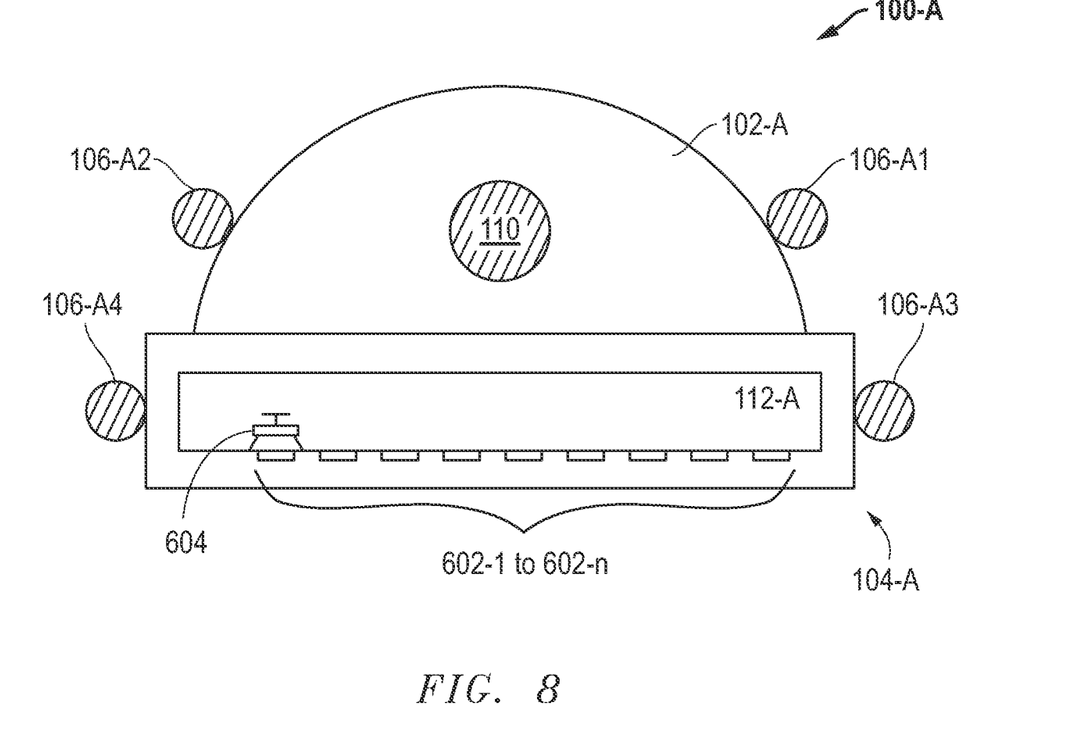
FIG. 8 is a front view of an alternative of the airship of FIG. 1.
Figure 9:
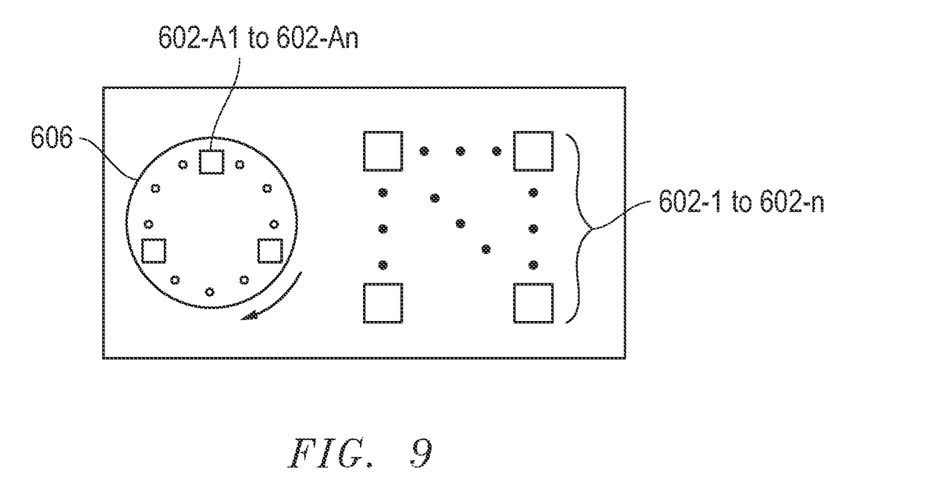
FIG. 9 is a plan view of an example layout for the hanger of the airship of FIG. 8.

Turning now to FIGS. 8 and 9, an alternate example of the airship 100-A can be seen. In this example, there is a single lift cell 102-2 with a substantially centrally placed wind generator 110. Additionally, in this example, thrusters 106-A1 to 106-A4 are secured to the lift cell 102-A and fuselage 104-A. Additionally, as shown in this example, the hanger can include charging pads 602-1 to 602-n (which in this example are arranged in a rectangular array with other arrangements being possible). These pad 602-1 to 602-n can be at least partially include inductive coils so as to allow drones (e.g., 604) to wireless recharge. For example, the pads (e.g., 602-1 to 602-n) and drones (e.g., 604) can use the Qi standard or any other wireless charging protocol. Additionally, pads (e.g., 602-A1 to 602-An) can be secured to and arranged in a pattern on a carousel 606. Such a carousel 606 would have a benefit of allowing the drones (e.g., 604) to continue to be charged while being loaded (assuming a top loaded drone). Additionally, the pads (e.g., 602) also includes hardpoints that allow drones (e.g., 604) to be mechanically secured to the pad (e.g., 602).

Figure 10:
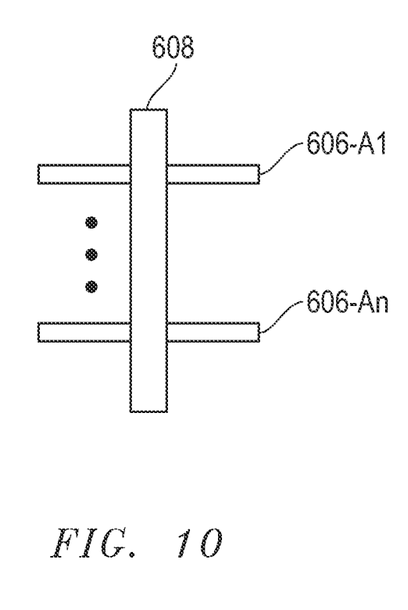
FIG. 10 depicts an example of an external recharging platform.

In FIG. 10, another alternative charging scheme can be seen. In this example, the drone carrying capacity of the airship (e.g., 100 or 100-A) can be increased by providing external locations where drones (e.g., 604) can be secured and charged. The central member 608 can be externally secured to either the fuselage (e.g., 104 or 104-A) or lift cell (e.g., 102). This central member can carry cables and provide controls for carousels 606-A1 to 606-An (which can be secured thereto). Thus, additional drones (e.g., 604), which may not be able to fit into a fully loaded airship (e.g., 100) would be able to be externally carried and recharged so as to increase the length of use of the airship (e.g., 100) before returned to a warehouse or base.

No terms are intended to be construed as means-plus-function terms unless the term "means" is expressly recited.

Having thus described the present disclosure by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present disclosure may be employed without a corresponding use of the other features. Accordingly, it is appropriate that the appended claims be construed broadly and consistent with the scope of the disclosure.

The invention claimed is:

1. An apparatus comprising:
a fuselage with a longitudinal axis and a transverse axis, wherein the fuselage includes a controller;
a thruster secured to the fuselage;
a wind generator having:
a housing that is secured to the fuselage substantially parallel to the longitudinal axis, wherein the housing has an interior that is hollow between first and second openings;
a flow straightener secured within the interior of the housing proximate to the first opening; and
a turbine secured within the interior of the housing between the flow straightener and the second opening, wherein the turbine is electrically coupled to the rectifier; and
a lift cell that is secured to the wind generator.

2. The apparatus of claim 1, wherein the lift cell is substantially filled with helium gas.

3. The apparatus of claim 2, wherein the turbine further comprises:
a bearing assembly that is secured to the housing of the wind generator;
a torque converter that is secured to the housing of the wind generator;
a turbine shaft that extends between the bearing assembly and the torque converter;
a plurality of blades, wherein each blade extends between the bearing assembly and the torque converter, wherein the shaft and the plurality of blades are collectively adapted to freely rotate;
a generator shaft that extends from the torque converter, wherein rotation of the turbine shaft and plurality of blades causes rotation of the generator shaft; and
an electric generator that is coupled to the generator shaft and that is coupled to the rectifier, wherein the electric generator is adapted to produce electricity.

4. The apparatus of claim 3, wherein the turbine further comprises a plurality of turbines.

5. The apparatus of claim 4, wherein the controller further comprises a tether, wherein the tether further comprises:
a power controller;
a guide coil assembly that is coupled to the power controller, wherein the guide coil assembly includes a guide wire;
a guide wire coupler that is secured to an end of the guide wire, wherein the guide wire coupler is configured to be secured to and inductively coupled to a power control receptacle so as to transmit and receive power control packets over the guide wire to the power controller, and wherein the guide wire coupler is dimensioned to be carried by a battery-powered drone;
a power coil assembly that is coupled to the power controller and the rectifier, wherein the power coil assembly further comprises a power cable; and
a power cable coupler having:
a guide loop that is configured to guide the power cable coupler along the guide wire; and
an insert that is coupled to an end of the power cable and that is configured to be secured to and inductively coupled to a power transmission receptacle so as to deliver power to the receptacle over the power cable.

6. The apparatus of claim 1, wherein the apparatus further comprises a photovoltaic cell that is secured to the lift cell.

7. The apparatus of claim 6, wherein the lift cell further comprises a plurality of lift cells.

8. A method comprising:
maneuvering an airship to a desired location, wherein the airship includes:
a fuselage with a longitudinal axis and a transverse axis having a controller;
a thruster secured to the fuselage;
a wind generator having:
a housing that is secured to the fuselage substantially parallel to the longitudinal axis, wherein the housing has an interior that is hollow between first and second openings;
a flow straightener secured within the interior of the housing proximate to the first opening; and
a turbine secured within the interior of the housing between the flow straightener and the second opening, wherein the turbine is electrically coupled to the rectifier; and
a lift cell that is secured to the wind generator;

orienting the airship with the thruster such that ambient wind is traveling in a direction that is substantially parallel to the longitudinal axis of the fuselage;

straightening airflow generated by the ambient wind with the flow straightener to generate a substantially laminar flow; and engaging the turbine with the airflow generated by the ambient wind to generate electricity.

9. The method of claim 8, wherein the controller further comprises a tether, wherein the tether further comprises:
   a power controller;
   a guide coil assembly that is coupled to the power controller, wherein the guide coil assembly includes a guide wire;
   a guide wire coupler that is secured to an end of the guide wire, wherein the guide wire coupler is configured to be secured to and inductively coupled to a power control receptacle so as to transmit and receive power control packets over the guide wire to the power controller, and wherein the guide wire coupler is dimensioned to be carried by a battery-powered drone;
   a power coil assembly that is coupled to the power controller and the rectifier, wherein the power coil assembly further comprises a power cable; and
   a power cable coupler having:
      a guide loop that is configured to guide the power cable coupler along the guide wire; and
      an insert that is coupled to an end of the power cable and that is configured to be secured to and inductively coupled to a power transmission receptacle so as to deliver power to the receptacle over the power cable, and wherein the method further comprises:

lifting the guide wire coupler with the battery-power drone;

carrying the guide wire coupler to the power control receptacle;

inserting the guide wire coupler into the power control receptacle;

securing the guide wire coupler with a grappler on the power control receptacle;

uncoiling the power cable so that the power cable coupler is guided by the guide loop and moving under the force of gravity; and securing the insert into the power transmission receptacle.

* * * * *